United States Patent [19]

Schobermayer

[11] Patent Number: 4,878,975

[45] Date of Patent: Nov. 7, 1989

[54] METHOD FOR PRODUCING A RIGID SHAPED BODY

[76] Inventor: Harald Schobermayer, 9/4 Heipelweg, A-8706 Leoben, Austria

[21] Appl. No.: 192,136

[22] Filed: May 10, 1988

Related U.S. Application Data

[62] Division of Ser. No. 820,712, Jan. 17, 1986, Pat. No. 4,748,042.

[30] Foreign Application Priority Data

Jan. 25, 1985 [AT] Austria .................................. 201/85

[51] Int. Cl.⁴ ........................ B29C 55/12; B29D 9/00; B32B 31/12
[52] U.S. Cl. .................................. 156/163; 156/189; 156/192; 156/229; 156/244.24; 264/320; 427/393.5
[58] Field of Search ................ 264/320; 156/163, 184, 156/189, 192, 229, 244.24; 427/393.5; 428/910

[56] References Cited

U.S. PATENT DOCUMENTS

| | | | |
|---|---|---|---|
| 3,616,197 | 10/1971 | Amberg et al. | 156/163 X |
| 3,783,067 | 1/1974 | Petzetakis | 156/163 |
| 4,225,644 | 9/1980 | Tsuchiya et al. | 156/163 X |
| 4,427,475 | 1/1984 | Molnar | 156/163 |
| 4,475,971 | 10/1984 | Canterino | 156/163 |

FOREIGN PATENT DOCUMENTS

| | | | |
|---|---|---|---|
| 31157 | 7/1981 | European Pat. Off. | |
| 413050 | 6/1974 | U.S.S.R. | 156/192 |

*Primary Examiner*—Jeffery Thurlow
*Assistant Examiner*—Leo B. Tentoni
*Attorney, Agent, or Firm*—Ostrolenk, Faber, Gerb & Soffen

[57] ABSTRACT

With a rigid shaped body of a plurality of oriented, i.e., stretched thermoplastic carriers in film, ribbon, monofil or fiber form, the plastic carriers are superposed and/or adjacently laminated and commonly pressed. In order to prevent a decrease in the favorable properties obtained by stretching of an individual plastic carrier during pressing, the stretched plastic carriers are coated with thermoplastic material on the sides getting into contact when superposed and/or adjacently laminated. The coating material has a crystallite melting temperature or a glass temperature lower than the plastic carriers. The thickness of two adjacent coating materials each is smaller than the thickness of a plastic carrier.

9 Claims, No Drawings

METHOD FOR PRODUCING A RIGID SHAPED BODY

This is a division of application Ser. No. 820,712, filed Jan. 17, 1986, now U.S. Pat. No. 4,748,072.

BACKGROUND OF THE INVENTION

The invention relates to a rigid shaped body, such as a plate or a pipe, comprised of a plurality of superposed and/or adjacently laminated, commonly pressed, oriented, i.e., stretched thermoplastic carriers in film, ribbon, monofil or fiber form.

By orienting thermoplastics, it is possible to change their physical properties. In particular, partially crystalline materials will exhibit elevated yield stress, resistance to tearing, puncture resistance, low-temperature resistance and transparency as well as a reduced breaking elongation. Big-scale drawing processes are primarily employed, normal to the running direction, for the production of products having small geometric dimensions, such as, for instance, films, film ribbons, monofils and fibers.

For the production of shaped bodies having larger geometric dimensions, it is known (European patent application No. 0,031,157) to commonly press stretched partially crystalline thermoplastic films of equal material upon pressure and temperature exposure. In doing so, the pressing temperature must be raised close to the temperature of the crystallite melting end of the film in order to obtain a sufficient motility of the molecule chains of the plastic films, because it is only then that a sufficient bonding adhesion will be provided. Such a high pressing temperature involves a relaxation of the orientation of the film, thus reducing the favorable properties attained by the drawing process. By the known method, it is, therefore, not possible to produce shaped bodies of larger dimensions that exhibit similarly good properties as the stretched carrier films.

SUMMARY OF THE INVENTION

The invention aims at avoiding these disadvantages and difficulties and has as its object to provide a shaped body of the initially defined kind, with which pressing at elevated temperatures does not lead to a remarkable decrease in the favorable properties attained by stretching an individual plastic carrier so that the shaped body, despite its larger geometric dimensions substantially exceeding the dimensions of the individual plastic carrier, approximately exhibits the mechanical and technological properties of an individual stretched plastic carrier.

This object is achieved according to the invention in that the stretched plastic carriers, on the sides getting into contact when superposed and/or adjacently laminated, are coated with thermoplastic material, the coating material having a crystallite melting temperature or a glass temperature lower than the plasticcarrier and the thickness of two adjacent coating materials each being smaller than the thickness of a plastic carrier.

DETAILED DESCRIPTION OF THE INVENTION

The adhesion of the commonly pressed plastic carriers, according to the invention, is ensured by the coating material of the same: When superposing and/or adjacently laminating the coated plastic carriers, the coating materials of neighboring plastic carriers come to lie at each other. Since the crystallite melting temperature in the case of partially crystalline coating material, or the glass temperature of amorphous coating material, lies below the crystallite melting temperature of the stretched, partially crystalline plastic carriers to be connected, or below the glass temperature of amorphous plastic carriers, respectively, it will do to choose as the pressing temperature a temperature at which the coating material melts to such an extent that a sufficient bonding adhesion between the coating materials of neighboring plastic carriers is effected.

Since the pressing temperature can be kept to below the crystallite melting temperature or the glass temperature, respectively, of the plastic carriers, the advantageous properties of the stretched plastic carriers are changed by the pressing temperature only very slightly, if at all.

Since the coating material, due to heating to the crystallite melting temperature or the glass temperature, or therebeyond, reduces the favorable properties of the shaped body as compared to the favorable properties of an individual stretched plastic carrier, the volume portion of the coating material in the shaped body is to be as low as possible, the volume of the coating material preferably amounting to 20 percent at most of the volume of the shaped body.

A preferred embodiment is characterized in that the plastic carriers consist of polypropylene and the coating material consists of polyethylene, polypropylene or of a copolymer thereof.

According to a further preferred embodiment, the ultimate tensile strength and the modulus of elasticity of the pressed shaped body formed of equally oriented laminated plastic carriers amount to at least 80 percent of the ultimate tensile strength and of the modulus of elasticity of a stretched plastic carrier, wherein, with a shaped body of bi-stretched plastic carriers, the ultimate tensile strength perpendicular to the running direction amounts to at least 170 N/mm$^2$ according to DIN 53455, the modulus of elasticity perpendicular to the running direction is at least 3,800 N/mm$^2$ according to DIN 53457 and the impact energy, measured at a 1.5 mm thick plate, is at least 60 J according to DIN 53453.

Another preferred embodiment is characterized in that the ultimate tensile strength and the modulus of elasticity of the shaped body formed by angularly laminated plastic carriers and pressed, amount to at least 40 percent of the maximum ultimate tensile strength and of the maximum modulus of elasticity, respectively, of a stretched plastic carrier, wherein, for a shaped body of bi-stretched plastic carriers, the ultimate tensile strength is at least 100 N/mm$^2$ according to DIN 53455, the modulus of elasticity is at least 2,200 N/mm$^2$ according to DIN 53457 and the impact energy, measured at a 1.5 mm thick plate, is at least 60 J according to DIN 53453.

Preferably, the shaped body has a minimum thickness of 3/10 mm, because from this thickness the good technological properties of the shaped body are particularly effective. This thickness results when using about at least ten plastic carriers of common thickness.

According to a preferred embodiment, at least one plastic carrier lying between the lowermost and the uppermost film-shaped plastic carriers is formed by a printed film-shaped plastic carrier or, preferably, a plastic carrier disposed between the lowermost and the uppermost film-shaped plastic carriers is replaced by a metal foil provided with an imprint, if desired. Thereby, labels and signboards or opaque shaped bodies may be produced in a simple manner, the opaque layer or the layer provided with an imprint lying well-protected within the shaped body.

According to a further preferred embodiment, the lowermost and/or uppermost plastic carrier is formed by a film of increased resistance to mechanical abrasion and/or to chemical attacks, the shaped body thus being usable, for instance, as panes or screens for vehicles.

A method for the production of a shaped body according to the invention, by connecting superposed and/or adjacently laminated stretched carriers of thermoplastics under thermal and pressure influence is characterized in that a plurality of plastic carriers coated with thermoplastic material on their mutual contact surfaces are commonly pressed at a temperature in the range of, or above, the crystallite melting temperature or the glass temperature of the coating material and below the crystallite melting temperature or the glass temperature of the stretched plastic carriers.

A sufficient adhesion between the pressed plastic carriers and the coating material suitably is obtained by using stretched plastic carriers to which the coating material has been applied by coextrusion.

According to another preferred embodiment, stretched plastic carriers to which the coating material has been applied with the help of adhesion mediators are used to obtain a sufficient adhesion between the plastic carriers and the coating material.

An advantageous embodiment of the method is characterized by using bi-stretched plastic carriers stretched by 1:3 to 1:6 in the running direction and by 1:8 to 1:12 perpendicular thereto and made of isotactic polypropylene, which have an ultimate tensile strength of about 200 N/mm$^2$ perpendicular to the running direction and a modulus of elasticity of about 4,200 N/mm$^2$ perpendicular to the running direction, after having been coated with a layer of copolymer polypropylene/polyethylene with a thickness of about 6 percent of the thickness of the plastic carrier in the extrusion process, wherein pressing suitably takes place to a pressure of at least 10 bar and at a temperature in the range of from 130° C. to 150° C., preferably at about 140° C., for a period of at least 5 s, whereupon cooling under pressure to a temperature at which the coating material is substantially solidified, or therebelow, is effected.

Preferably, the shaped body is formed by winding a coated plastic carrier about a mandrel, and pressing takes place merely by heating the shaped body to a temperature above the crystallite melting temperature or the glass temperature of the coating material and to below the crystallite melting temperature or the glass temperature of the stretched plastic carrier.

With a method of this type, the winding body is formed by bi-stretched plastic carriers stretched by 1:3 to 1:6 in the running direction and by 1:8 to 1:12 perpendicular thereto and made of isotactic polypropylene, and is heated to a temperature in the range of from 130° C. to 150° C., preferably to a temperature of about 140° C., and subsequently is cooled to room temperature.

The invention will now be explained in more detail by way of exemplary embodiments.

As the starting material for the production of a plate-shaped body having a plate thickness of 1.5 mm, a bi-stretched polypropylene film coated on both sides with an ethylene/propylene copolymer by the coextrusion method was chosen. The stretching ratio of the polypropylene film was 4 to 5 in the longitudinal direction and 8 to 12 perpendicular thereto. The thickness of the polypropylene film including the coatings on both sides amounted to 0.03 mm, the thickness of the coating on either side was 0.0015 mm.

TABLE 1

| Characteristic data of the stretched polypropylene film. | |
|---|---|
| Thickness (mm) | 0.03 |
| Modulus of elasticity (tangential modulus 0.1) DIN 53457 | |
| longitudinal direction | 2,300 (N/mm$^2$) |
| perpendicular direction | 4,700 (N/mm$^2$) |
| Ultimate tensile strength DIN 53455 | |
| longitudinal direction | 80 (N/mm$^2$) |
| perpendicular direction | 210 (N/mm$^2$) |
| Breaking elongation DIN 53455 | |
| longitudinal direction | ~150 (%) |
| perpendicular direction | ~20 (%) |

50 of such polypropylene films were superposed to a stack, i.e., were stacked one above the other with the same orientation. This stack was pressed at a specific pressing power of 25 bar and at a pressing temperature of 140° C. for a period of 10 s. Subsequently, cooling under pressure to about 60° C. was effected. The shaped body pressed in this way had a thickness of 1.5 mm.

TABLE 2

| Characteristic data of the pressed shaped body | |
|---|---|
| Thickness (mm) | 1.5 (50 layers of 0.03 each) |
| Modulus of elasticity (tangential modulus 0.1) DIN 53457 | |
| longitudinal direction | at least 2,100 (N/mm$^2$) |
| perpendicular direction | at least 4,650 (N/mm$^2$) |
| Ultimate tensile strength DIN 53455 | |
| longitudinal direction | 75 (N/mm$^2$) |
| perpendicular direction | 200 (N/mm$^2$) |
| Breaking elongation DIN 53455 | |
| longitudinal direction | ~175 (%) |
| perpendicular direction | ~25 (%) |
| Impact energy in the falling-pin test DIN 53453 | 80 (J) |
| (Plate thickness (mm) 1.5, plate diameter (mm) 84, falling height (cm) 100, mass (kg) 24.5, test temperature (°C.) 23) | |
| Luminous values DIN 5036, Schuch method, BASF | |
| Total transmittance T | 90 (%) |
| Total scattering portion SI | 7 (%) |
| Wide-angle scattering portion SII | 3 (%) |

In the following Table 3, the characteristic data of an isotropic shaped body produced by pressing in the conventional manner, also of polypropylene, and having a

TABLE 3

| Characteristic data of the isotropic shaped body | |
|---|---|
| Ultimate tensile strength DIN 53455 | 35 (N/mm$^2$) |
| Breaking elongation DIN 53455 | about 700 (%) |
| Flexural creep modulus | 1,300 (N/mm$^2$) |
| Impact energy in the falling-pin test DIN 53443 | 2 (J) |
| (Plate thickness (mm) 1.5, plate diameter (mm) 84, falling height (cm) 100, mass (kg) 24.5, test temperature (°C.) 23). | |
| Luminous values DIN 5036, Schuch method, BASF | |
| Total transmittance T | 81 (%) |
| Total scattering portion SI | 81 (%) |
| Wide-angle scattering portion SII | 64 (%) |

A comparison of the Tables shows that the modulus of elasticity, the ultimate tensile strength and the elongation at break, of the pressed shaped body are only slightly lower than the corresponding values of the stretched polypropylene film. There are remarkable differences as to the ultimate tensile strength, the elongation at break and the impact energy, between the pressed shaped body and the isotropic shaped body. For instance, the impact energy of the pressed shaped body is higher than the impact energy of the isotropic shaped body by the factor 40. Also are the luminous values of the pressed shaped body with regard to transparency considerably better than the luminous values of the isotropic shaped body.

In the following Table 4, the mechanical-technological values are indicated for a shaped body produced of the same starting material and substantially in the same manner as the previously described shaped body, yet composed of films laminated in cross bond. By cross bond, an angular bond is meant, in which the individual layers of the plastic carrier are torsionally stacked by 90° each relative to the layer arranged therebelow, with respect to their orientation obtained by stretching.

TABLE 4
Characteristic data of the pressed shaped body

| | |
|---|---|
| Thickness (mm) | 1.5 (50 layers of 0.03 each) |
| Modulus of elasticity (tangential modulus 0.1) DIN 53457 | |
| longitudinal direction or perpendicular direction | at least 3,400 (N/mm$^2$) |
| 45° direction | at least 2,700 (N/mm$^2$) |
| Ultimate tensile strength DIN 53455 | |
| lonitudinal direction or perpendicular direction | 75 (N/mm$^2$) |
| Impact energy in the falling-pin test DIN 53453 | 80 (J) |
| (Plate thickness (mm) 1.5, plate diameter (mm) 84, falling height (cm) 100, mass (kg) 24.5, test temperature (°C.) 23) | |
| Luminous values DIN 5036, Schuch method, BASF | |
| Total transmittance T | 90 (%) |
| Total scattering portion SI | 7 (%) |
| Wide-angle scattering portion SII | 3 (%) |

The invention is not limited to the exemplary embodiments explained in detail, but may be modified in various aspects. Thus, it is possible to produce shaped bodies not only by pressing large-area foils, but also by winding film ribbons, fibers or monofils around mandrels. The thermal shrinkage of the stretched plastic carriers, which depends on the degree of stretching of the same, under certain conditions suffices to produce the pressing power necessary to bring about the bonding adhesion between the plastic carriers so that a separate pressure action from outside can be obviated. An example for this is the following:

A film according to Table 1 was cut in the longitudinal direction into ribbons of 10 mm width and the ribbons were wound about a mandrel of 30 mm diameter. Subsequently, tempering took place at 140° C. with a subsequent cooling to removal temperature (room temperature). To achieve bonding of the ribbons, no additional external pressure was required; the thermal shrinkage occurring during tempering in this case was enough to press the individual layers of the ribbons sufficiently firm at each other.

Furthermore, it is possible, by special arrangement of the individual layers of the plastic carriers, to effect an anisotropy aimed at offering dimensions of shaped parts in accordance with special demands.

A shaped body according to the invention need not be built up of identical plastic carriers, but it is possible to use plastic carriers of different materials and different dimensions (such as, e.g., thicknesses), thereby producing a shaped body that meets the demands set on it.

Furthermore, it is possible to substitute a metal foil or a plastic carrier with an imprint for a plastic carrier, thus obtaining a graphic design of the shaped body in a simple manner and preventing damage to the metal foil or the imprinted plastic carrier, because they are arranged within the shaped body. For the production of shaped bodies being of interest as panes or screens, for instance, the lowermost and/or the uppermost plastic carrier is formed by a film exhibiting an elevated scratch resistance, such as polyester film. Also in this case, it is possible to provide films with an increased resistance to chemical attacks, the applicability of the shaped body according to the invention thus being even further increased.

What I claim is:

1. A method of forming a rigid shaped body which comprises at leat ten high melting point thermoplastic layers having a high molecular orientation alternating with low melting point thermoplatic layers substantially without molecular orientation, the low melting point layers comprising up to about 20 volume percent of the volume of the rigid shaped body, the method comprising the steps of:

adjacently arranging a plurality of at least ten high melting point thermoplastic carriers having a high molecular orientation and having coatings of low melting point thermoplastic thereon so that the coatings contact each other, the combined thickness of any two adjacent coatings being lower than the thickness of one of the carriers; and commonly pressing said adjacently arranged carriers having coatings thereon at a temperature in the range of or above the crystallite melting temperature or the glass temperature of the coatings and below the crystallite melting temperature or the glass temperature of the carriers, such that the coatings of adjacent thermoplastic carriers bond together to form a rigid shaped body without altering said high molecular orientation of said thermoplastic carriers.

2. A method as set forth in claim 1, wherein coating of said molecularly oriented plastic carriers with said coating material is effected by coextrusion.

3. A method as set forth in claim 1, wherein coating of said molecularly oriented plastic carriers with said coating material is effected with the help of an adhesion mediator.

4. A method as set forth in claim 1, wherein biaxially molecularly oriented plastic carriers stretched by 1:3 to 1:6 in the running direction and by 1:8 to 1:12 perpendicular thereto and made of isotatic polypropylene, having an ultimate tensile strength of about 200 N/mm$^2$ perpendicular to the running direction and a modulus of elasticity of about 4,200 N/mm$^2$ perpendicular to the running direction, are coated by extrusion with a layer of copolymer polypropylene/polyethylene with a thickness of about 6 percent of the thickness of a plastic carrier and commonly pressed.

5. A method as set forth in claim 4, wherein pressing is effected at a pressure of at least 10 bar and at a temperature in the range of from 130° C. to 150° C., for a period of at least 5 seconds, followed by cooling under pressure influence to a temperature at which said coating material is essentially solidified or therebelow.

6. A method as set forth in claim 5, wherein pressing is effected at a temperature of about 140° C.

7. A method as set forth in claim 1, wherein forming of said shaped body is effected by winding a coated plastic carrier about a mandrel and pressing is effected merely by heating said wound coated plastic carrier to a temperature above one of the crystallite melting temperature or the glass temperature of said coating material and below one of the crystallite melting temperature or the glass temperature of said stretched plastic carrier.

8. A method as set forth in claim 7, wherein biaxially molecularly oriented plastic carriers stretched by 1:3 to 1:6 in the running direction and by 1:8 to 1:12 perpendicular thereto and made of isotactic polypropylene are wound about said mandrel so as to form said shaped body, and said shaped body is heated to a temperature in the range of from 130° C. to 150° C. and subsequently is cooled to room temperature.

9. A method as set forth in claim 8, wherein said shaped body is heated to a temperature of about 140° C.

* * * * *